United States Patent
Tsuji et al.

(10) Patent No.: US 9,564,116 B2
(45) Date of Patent: Feb. 7, 2017

(54) ULTRASONIC-TRANSDUCER MOUNTING STRUCTURE

(75) Inventors: Takashi Tsuji, Mie (JP); Naoya Azuma, Mie (JP); Yasushi Nagano, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 741 days.

(21) Appl. No.: 13/992,671

(22) PCT Filed: Dec. 9, 2011

(86) PCT No.: PCT/JP2011/078591
§ 371 (c)(1),
(2), (4) Date: Jun. 7, 2013

(87) PCT Pub. No.: WO2012/077793
PCT Pub. Date: Jun. 14, 2012

(65) Prior Publication Data
US 2013/0250732 A1    Sep. 26, 2013

(30) Foreign Application Priority Data

Dec. 10, 2010    (JP) .................................. 2010-275646

(51) Int. Cl.
*G01K 11/04*    (2006.01)
*G10K 11/00*    (2006.01)
(Continued)

(52) U.S. Cl.
CPC ........... *G10K 11/004* (2013.01); *B60R 19/483* (2013.01); *G01S 7/521* (2013.01); *G01S 2015/937* (2013.01); *G01S 2015/938* (2013.01)

(58) Field of Classification Search
CPC ........ B60R 19/483; B60R 19/48; G01S 7/521; G01S 2015/938; G01S 2015/937; G10K 11/004; G10K 11/00
(Continued)

(56) References Cited

U.S. PATENT DOCUMENTS 6,279,210 B1 *  8/2001  Faass ...................... F16B 9/023
                                                           24/457
6,318,774 B1   11/2001  Karr et al.
(Continued)

FOREIGN PATENT DOCUMENTS

DE          19621964 A1    12/1997
DE          19924505 A1    11/2000
(Continued)

OTHER PUBLICATIONS

International Search Report issued in PCT/JP2011/078591, mailed Jan. 17, 2012.
(Continued)

*Primary Examiner* — Luke Ratcliffe
*Assistant Examiner* — Amienatta M Ndure Jobe
(74) *Attorney, Agent, or Firm* — McDermott Will & Emery LLP (57) ABSTRACT

The ultrasonic-transducer mounting structure includes: a housing including: a body part which is formed into a hollow cylindrical shape and is provided at its front surface with a transmission surface allowing an ultrasonic wave to pass therethrough and is designed to accommodate an ultrasonic transducer therein; and plural connection pieces provided to a side surface of the body part; and a holder fixed to a rear surface of a bumper and designed to hold the housing such that the transmission surface of the housing is exposed via an opening of the bumper. The holder includes plural reception pieces to which the plural connection pieces are
(Continued)

detachably coupled respectively. The plural reception pieces are fixed to the rear surface of the bumper to surround the opening.

7 Claims, 4 Drawing Sheets

(51) Int. Cl.
*B60R 19/48* (2006.01)
*G01S 7/521* (2006.01)
*G01S 15/93* (2006.01)

(58) Field of Classification Search
USPC .......................................................... 367/173
See application file for complete search history.

(56) References Cited

U.S. PATENT DOCUMENTS

| | | | | |
|---|---|---|---|---|
| 2005/0265035 | A1* | 12/2005 | Brass | F21L 4/00 362/451 |
| 2006/0232052 | A1* | 10/2006 | Breed | B60R 21/013 280/735 |
| 2006/0267359 | A1* | 11/2006 | Blake | B60R 19/483 293/120 |
| 2007/0079661 | A1 | 4/2007 | Yoshida et al. | |
| 2008/0060439 | A1* | 3/2008 | Niemann | G01S 7/521 73/658 |
| 2008/0147280 | A1* | 6/2008 | Breed | B60J 10/00 701/46 |
| 2008/0212319 | A1* | 9/2008 | Klipstein | B60Q 3/065 362/231 |
| 2008/0243342 | A1* | 10/2008 | Breed | B60R 21/0132 701/45 |
| 2008/0315050 | A1 | 12/2008 | Buckley et al. | |
| 2009/0223296 | A1 | 9/2009 | Sato et al. | |

FOREIGN PATENT DOCUMENTS

| | | | | |
|---|---|---|---|---|
| DE | 103 47 098 A1 | | 5/2005 | |
| DE | 102005049140 A1 | | 4/2007 | |
| DE | 10 2008 016 558 A1 | | 10/2009 | |
| EP | 2 068 171 A1 | | 6/2009 | |
| EP | 2650694 A1 | * | 10/2013 | ........... B60R 19/483 |
| IT | EP 2068171 A1 | * | 6/2009 | ............. G01S 7/521 |
| JP | H0-123236 A | | 5/1998 | |
| JP | 2001-502406 A | | 2/2001 | |
| JP | 2001-527480 A | | 12/2001 | |
| JP | 2004-251665 A | | 9/2004 | |
| JP | 2007-107954 A | | 4/2007 | |
| JP | 2009-214610 A | | 9/2009 | |
| JP | 2010-194441 A | | 9/2010 | |
| KR | 20090006669 A | * | 1/2009 | |

OTHER PUBLICATIONS

European Search Report issued in European Application No. 11846662.2 dated Jul. 1, 2014.

* cited by examiner

ULTRASONIC-TRANSDUCER MOUNTING STRUCTURE

RELATED APPLICATIONS

This application is the U.S. National Phase under 35 U.S.C. §371 of International Application No. PCT/JP2011/078591, filed on Dec. 9, 2011, which claims priority to JP2010-275646, filed on Dec. 10, 2010, the disclosures of which Applications are incorporated by reference herein.

TECHNICAL FIELD

The present invention relates to ultrasonic-transducer mounting structures, and particularly to an ultrasonic-transducer mounting structure for mounting an ultrasonic transducer on a bumper of a vehicle.

BACKGROUND ART

In the past, there has been provided an ultrasonic transducer such as an ultrasonic speaker (ultrasonic transmitter) producing an ultrasonic wave and an ultrasonic microphone (ultrasonic receiver) receiving an ultrasonic wave.

Further, in the past, there has been provided an ultrasonic sensor which detects an object by use of such an ultrasonic transducer. In other words, there has been proposed an ultrasonic sensor which transmits an ultrasonic wave and receives an ultrasonic wave reflected by an obstacle. For example, such an ultrasonic sensor includes a Doppler sensor configured to judge, based on a Doppler shift derived from a received ultrasonic wave, whether an obstacle is present.

Figure 6:
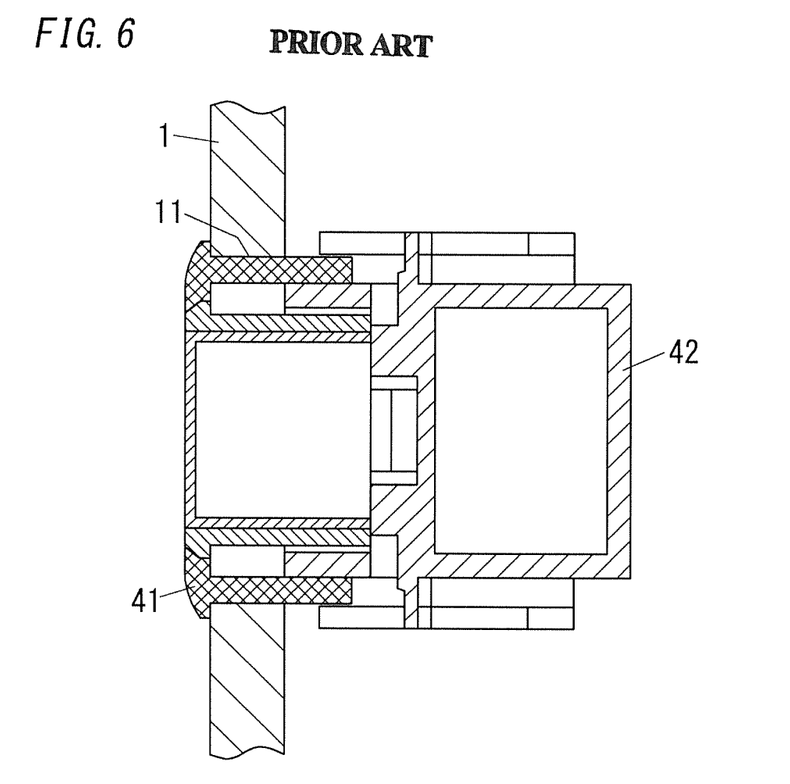
FIG. 6 is a sectional view illustrating the prior art.

As shown in FIG. 6, such an ultrasonic sensor is in use mounted on a bumper 1 of a vehicle (see document 1 [JP2010-194441 A]).

Such an ultrasonic sensor is described in detail below. The ultrasonic sensor shown in FIG. 6 is fixed to the bumper 1 by inserted into an exposing hole 11 formed in the bumper 1, and includes an outer block 41 inserted into the exposing hole 11 from an outside of the bumper 1 and an inner block 42 coupled to the outer block 41 in an inside of the bumper 1. In brief, the outer block 41 and the inner block 42 are coupled to each other such that the bumper 1 is interposed between the outer block 41 and the inner block 42. Hence, the aforementioned ultrasonic sensor is fixed to the bumper 1.

However, in such a structure in which the bumper 1 is interposed between the outer block 41 and the inner block 42 as shown in FIG. 6, part of the outer block 41 is protruded outside the bumper 1 (left side in FIG. 6). Thus, an appearance of the vehicle in which the ultrasonic sensor mounted on the bumper 1 is deteriorated.

SUMMARY OF INVENTION

In view of the above insufficiency, the present invention has aimed to propose an ultrasonic-transducer mounting structure capable of improving an appearance of a vehicle where an ultrasonic transducer is mounted on a bumper.

The first aspect of the ultrasonic-transducer mounting structure in accordance with the present invention includes: a housing including: a body part which is formed into a hollow cylindrical shape and is provided at its front surface with a transmission surface allowing an ultrasonic wave to pass therethrough and is designed to accommodate an ultrasonic transducer therein; and plural connection pieces provided to a side surface of the body part; and a holder fixed to a rear surface of a bumper and designed to hold the housing such that the transmission surface of the housing is exposed via an opening of the bumper. The holder includes plural reception pieces to which the plural connection pieces are detachably coupled respectively. The plural reception pieces are fixed to the rear surface of the bumper to surround the opening.

With regard to the second aspect of the ultrasonic-transducer mounting structure in accordance with the present invention, in the first aspect, the holder includes plural fixed plates respectively corresponding to the plural reception pieces. Each fixed plate has a first surface in a thickness direction and is fixed to the rear surface of the bumper at its first surface. Each fixed plate has a second surface in the thickness direction to which the corresponding reception piece is provided. Each fixed plate is flexible to allow the fixed plate to be deformed along the rear surface of the bumper.

With regard to the third aspect of the ultrasonic-transducer mounting structure in accordance with the present invention, in the second aspect, the fixed plate is provided with at least one of a slit and a groove to allow the fixed plate to be bent along the rear surface of the bumper.

With regard to the fourth aspect of the ultrasonic-transducer mounting structure in accordance with the present invention, in any one of the first to third aspects, the connection piece and the reception piece corresponding to this connection piece are designed to be in contact with each other in a rotation direction around a central axis of the opening.

With regard to the fifth aspect of the ultrasonic-transducer mounting structure in accordance with the present invention, in any one of the first to fourth aspects, the holder is designed to hold the housing such that the body part is in contact with the rear surface of the bumper at a predetermined pressure.

DESCRIPTION OF EMBODIMENTS

Figure 1:
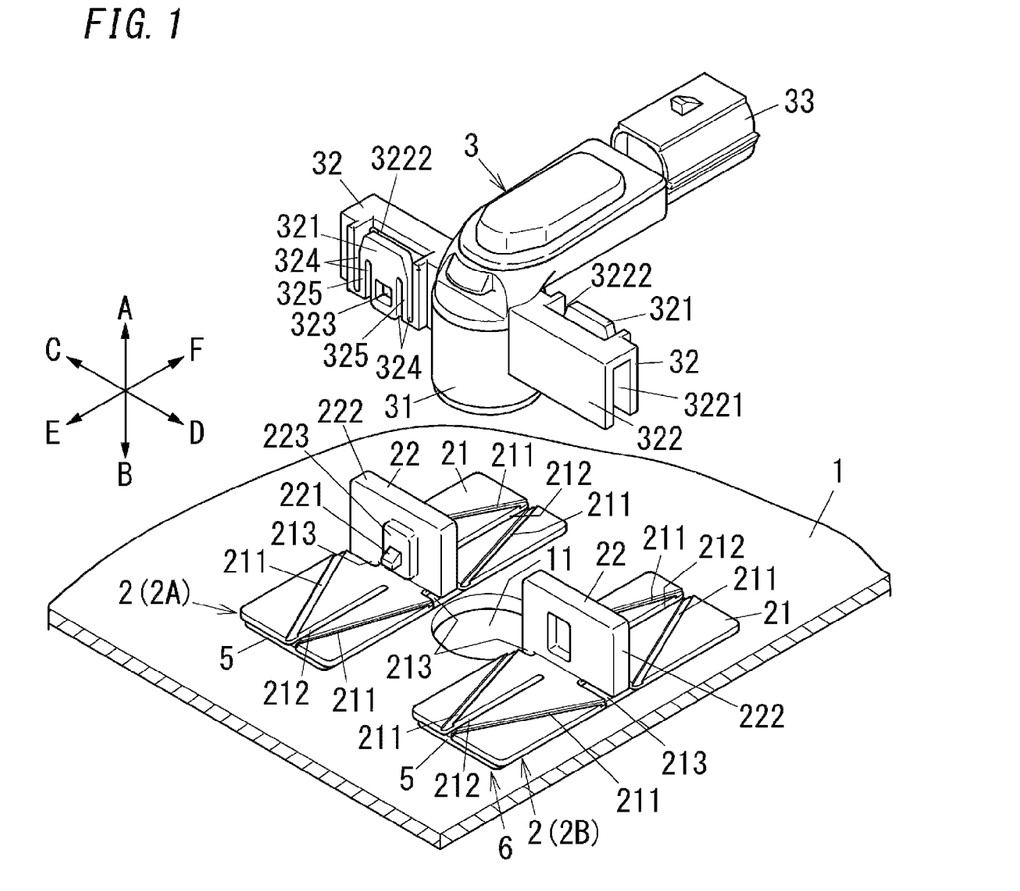
FIG. 1 is an exploded perspective view illustrating the ultrasonic-transducer mounting structure of one embodiment in accordance with the present invention.
Figure 2:
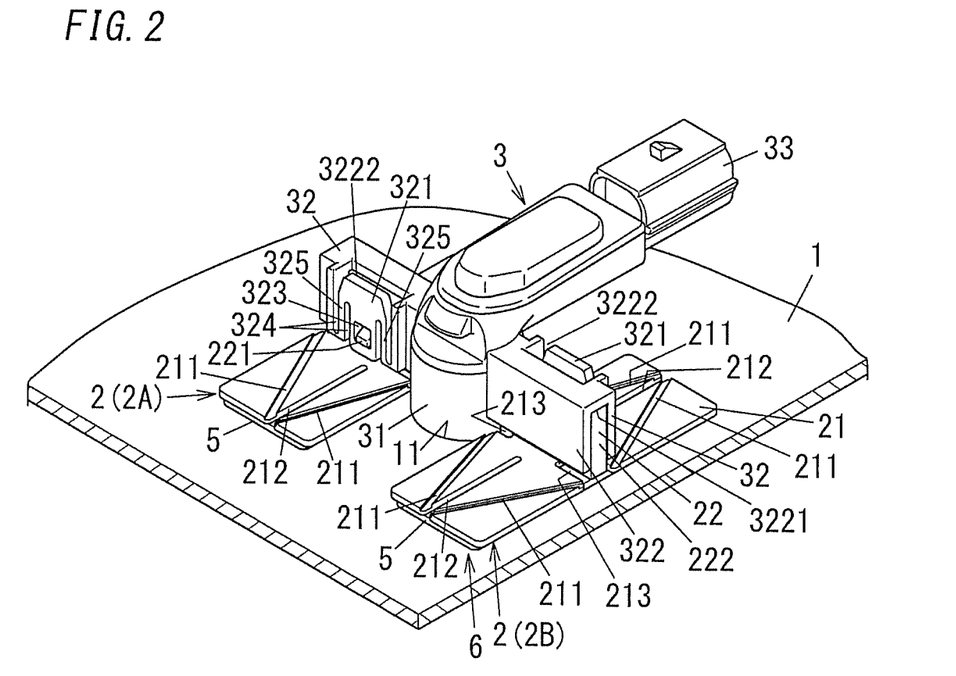
FIG. 2 is a perspective view illustrating the ultrasonic-transducer mounting structure of the above embodiment.

As shown in FIG. 1, the ultrasonic-transducer mounting structure of the present embodiment includes a housing 3 and a holder 6.

The housing 3 is made of synthetic resin. The housing 3 includes a body part 31, plural connection pieces 32, and a connector part 33.

The body part 31 is formed into a hollow cylindrical shape and is provided at its front surface with a transmission surface 311 allowing an ultrasonic wave to pass therethrough and is designed to accommodate an ultrasonic transducer (not shown) therein.

In the present embodiment, the ultrasonic transducer is an electro-acoustic transducer which has a function of transmitting an ultrasonic wave and a function of receiving an ultrasonic wave. Thus, an ultrasonic wave produced by the ultrasonic transducer is sent outside via the transmission surface 311. Further, an external ultrasonic wave is received by the ultrasonic transducer via the transmission surface 311.

Note that, the ultrasonic transducer may have either a function of transmitting an ultrasonic wave or a function of receiving an ultrasonic wave. Alternatively, a set of an ultrasonic transducer transmitting an ultrasonic wave and an ultrasonic transducer receiving an ultrasonic wave can be used.

The body part 31 accommodates a signal processing circuit (not shown) therein. The signal processing circuit performs a process of controlling the ultrasonic transducer to produce an ultrasonic wave and a process of detecting an obstacle based on an output from the ultrasonic transducer. Note that, a configuration of the signal processing circuit is modified according to a configuration of the ultrasonic transducer.

The connection piece 32 is provided to a side surface of the body part 31. In the present embodiment, the housing 3 includes the two connection pieces 32. The two connection pieces 32 are arranged in line in a direction perpendicular to a central axis of the body part 31. This connection piece 32 is used for fixing the housing 3 to the holder 6.

The connector part 33 is used for connecting the body part 31 to an external circuit.

The body part 31 and the connector part 33 out of components of the housing 3 can be formed based on the well-known configurations. Therefore, explanations to the configurations of the body part 31 and the connector part 33 are deemed unnecessary.

The holder 6 is fixed to a rear surface (upper surface in FIG. 1) of a bumper 1 and designed to hold the housing 3 such that the transmission surface 311 of the housing 3 is exposed via an opening 11 of the bumper 1.

The holder 6 includes: plural (two, in the present embodiment) reception pieces 22 to which the plural (two, in the present embodiment) connection pieces 32 are detachably coupled respectively; and plural fixed plates 21 respectively corresponding to the plural reception pieces 22.

The fixed plate 21 has a first surface 21*a* (lower surface, in FIG. 1) in a thickness direction and is fixed to the rear surface of the bumper 1 at its first surface 21*a*. The fixed plate 21 has a second surface 21*b* (upper surface, in FIG. 1) in the thickness direction to which the corresponding reception piece 22 is provided. The fixed plate 21 is flexible to allow the fixed plate 21 to be deformed along the rear surface of the bumper 1.

In the present embodiment, the single fixed plate 21 and the single reception piece 22 constitute a single mounting base 2.

Accordingly, the holder 6 includes the two mounting bases 2 (2A and 2B). The two mounting bases 2A and 2B are fixed to the rear surface of the bumper 1 to surround the opening 11. In other words, the plural reception pieces 22 are fixed to the rear surface of the bumper 1 to surround the opening 11. In the present embodiment, the two mounting bases 2A and 2B are fixed to the rear surface of the bumper 1 to be on opposite sides of the opening 11. Especially, the two mounting bases 2A and 2B are formed into the same shape, and positioned in a two-fold rotational symmetry manner with regard to the central axis of the opening 11.

As mentioned above, the ultrasonic-transducer mounting structure of the present embodiment includes the ultrasonic transducer having a function of receiving an ultrasonic wave. Hence, the ultrasonic-transducer mounting structure of the present embodiment can be regarded as an ultrasonic sensor mounting structure.

The following is a detailed explanation made to the ultrasonic-transducer (ultrasonic sensor) mounting structure of the present embodiment.

As shown in FIG. 1, the present embodiment is fixed to the bumper 1 through which the exposing hole (opening) 11 having a circular shape is formed, and includes the two mounting bases 2 and the sensor body (housing) 3. The two mounting bases 2 are located on the opposite sides of the exposing hole 11 respectively and are bonded to an inner surface (upper surface in FIG. 1) of the bumper 1. The sensor body (housing) 3 is detachably coupled to each of the mounting bases 2 in a fitting manner.

In the following explanation, A, B, C, D, E, and F directions in FIG. 1 are referred to as upward, downward, left, right, forward, and rearward directions, respectively. In brief, each of a direction which extends along a thickness direction of the bumper 1 and is directed to an inside of the bumper 1 and a direction to which the ultrasonic transducer mounted on the bumper 1 is directed is referred to as the upward direction. Further, a direction in which the mounting bases 2 are arranged in line is referred to as a left and right direction. Note that, the aforementioned directions are defined for simplifying explanations, and are not always identical to actual directions of the ultrasonic transducer in use. In the present embodiment, the ultrasonic transducer is used such that the downward direction determined above is directed to a forward direction or a rearward direction of a vehicle.

The following is a detailed explanation of the present embodiment. For example, the respective mounting bases 2 are made of synthetic resin, and have the same dimensions and shape. Each of the mounting bases 2 includes the fixed part (fixed plate) 21 and the connection part (reception piece) 22. The fixed part (fixed plate) 21 is formed into a rectangle flat plate shape in whole and has a thickness direction along the upward and downward direction and a lengthwise direction along the forward and rearward direction. The connection part (reception piece) 22 is protruded from a center in the forward and rearward direction of an upper surface of the fixed part 21. The connection part (reception piece) 22 is formed into a flat plate shape and has a thickness direction along the forward and rearward direction. For example, the fixed part 21 of each of the mounting bases 2 has a lower surface which is bonded to the inner surface of the bumper 1 by use of an adhesive sheet 5 known. Note that, the respective mounting bases 2 may be fixed to the inner surface of the bumper 1 by use of another method such as bonding by adhesive, welding, and screwing instead of bonding by the aforementioned adhesive sheet 5.

The bumper 1 constitutes part of an exterior of a vehicle. Hence, the bumper 1 is shaped to have a curved surface according to a design of a vehicle. In view of this, in the present embodiment, the fixed part 21 of the mounting base 2 is provided with plural grooves 211 and plural slits 212 and 213. The grooves 211 are formed in the upper surface and are positioned on opposite sides of the connection part 22 in the forward and rearward direction. The slits 212 and 213 have their opened upper and lower ends. With appropriately bending the fixed part 21 at a portion thinned by the aforementioned grooves 211 and/or with deforming the fixed part 21 to change widths of the aforementioned slits 212 and 213, the fixed part 21 can be attached to a curved surface which is not curved sharply. Further, protruded from one surface (a front surface of the left mounting base 2, a rear surface of the right mounting base 2) in a thickness direction of the connection part 22 of the mounting base 2 is a latching protrusion 221. The latching protrusion 221 has an inclined surface such that a protruded dimension becomes smaller towards an upper end (away from the fixed part 21). In the present embodiment, for example, the latching protrusion 221 is positioned on the above surface and is deviated slightly right and downward from the center. The slits 212 and 213 include the two slits (hereinafter, referred to as "first slit") 212 and the two slits (hereinafter, referred to as "second slit") 213. One of the two slits 212 extends from a site close to the front latching protrusion 221 to a front end along the forward direction, and the other extends from a site close to the rear latching protrusion 221 to a rear end along the rearward direction. One of the two slits 213 is formed in a left side of the latching protrusion 221 and has an opened left end and separates the connection part 22 from front and rear portions of the fixed part 21 with regard to the connection part 22, and the other is formed in a right side of the latching protrusion 221 and has an opened right end and separates the connection part 22 from front and rear portions of the fixed part 21 with regard to the connection part 22. Further, a set of the two grooves 211 is provided to each of the front and rear sides of the connection part 22. One of the two grooves 211 extends from a site close to a left end of the connection part 22 to an opened end (i.e., an external end in the forward and rearward direction) of the first slit 212, and the other extends from a site close to a right end of the connection part 22 to the opened end of the first slit 212. Note that, the number of grooves 211, the shape of the groove 211, the number of slits 212 (or 213), and the shape of the slit 212 (or 213) are appropriately modified according to the shape of the intended bumper 1.

As mentioned above, the fixed plate 21 is formed into a rectangular plate shape and has the lengthwise direction (direction indicated by arrows E and F) and a width direction (direction indicated by arrows C and D). The fixed plate 21 is formed of resilient (elastic) resin material. Accordingly, the fixed plate 21 has flexibility to allow the fixed plate 21 to be deformed along the rear surface of the bumper 1.

Further, the fixed plate 21 is provided with the slits 212 and 213 and the grooves 211 to allow the fixed part 21 to be bent along the rear surface of the bumper.

In the present embodiment, the fixed plate 21 includes the two slits 212, the two slits 213, and the four grooves 211. The slits 212 extend, along the lengthwise direction of the fixed plate 21, from a first end (end in the direction indicated by arrow E) and a second end (end in the direction indicated by arrow F) to the center of the fixed plate 21 in the lengthwise direction, respectively. The slits 212 facilitate bend of the fixed plate 21 in the width direction of the fixed plate 21. The slits 213 extend, along the width direction of the fixed plate 21, from a first end (end in the direction indicated by arrow C) and a second end (end in the direction indicated by arrow D) to the center of the fixed plate 21 in the width direction, respectively. The slits 213 facilitate bend of the fixed plate 21 in the lengthwise direction of the fixed plate 21. Each of the four grooves 211 is formed in the second surface in the thickness direction of the fixed plate 21. Each of the four grooves 211 is formed into a straight shape so as to connect between the opened ends of the respective slits 212 and 213. This groove 211 facilitates bend of the fixed plate 21 in a diagonal direction of the fixed plate 21.

The reception piece 22 protrudes from the second surface 21b in the thickness direction of the fixed plate 21. The reception piece 22 is designed to be detachably connected to the connection piece 32 of the housing 3. The reception piece 22 includes the latching protrusion 221, a basement 222, and a pedestal 223. The basement 222 is formed into a rectangular plate shape. The basement 222 has a width direction (direction indicated by arrows C and D) equal to the width direction of the fixed plate 21, and a thickness direction (direction indicated by arrows E and F) equal to the lengthwise direction of the fixed plate 21. The pedestal 223 is formed on a first surface in the thickness direction (a surface in the direction indicated by arrow E with regard to the mounting base 2A, and a surface in the direction indicated by arrow F with regard to the mounting base 2B) of the basement 222. The pedestal 223 is formed into a rectangular parallelepiped shape. The latching protrusion 221 is formed on a front surface (a surface in the direction indicated by arrow E with regard to the mounting base 2A, and a surface in the direction indicated by arrow F with regard to the mounting base 2B) of the pedestal 223.

Further, the sensor body 3 includes the body part 31, the connection parts (connection pieces) 32, and the connector part 33. The body part 31 is formed into a cylindrical shape and has an axial direction equal to the upward and downward direction. The connection parts (connection pieces) 32 are protruded, along a radial direction (outward direction in the left and right direction) of the body part 31, from two opposite sites on an outer peripheral surface of the body part 31 in the left and right direction, respectively. The connector part 33 extends rearwardly of the body part 31 from an upper end of the body part 31. The body part 31 of the sensor body 3 holds a transceiver (not shown) defined as an ultrasonic transducer serving as a transmitter sending an ultrasonic wave and a receiver receiving an ultrasonic wave. The body part 31 of the sensor body 3 has a lower end surface which serves as a transmitting and receiving surface 311 which allows transmission and reception of an ultrasonic wave. The aforementioned transceiver is designed to make conversion between an ultrasonic wave and an electric signal. For example, this transceiver is constituted by use of a piezoelectric device in view of well-known techniques. Further, the connector part 33 holds a connector for making electrical connection with an external circuit. Furthermore, circuit components constituting a signal processing circuit performing signal processing such as amplification and noise canceling between the transceiver and the external circuit may be housed in and held by the body part 31 and the connector part 33.

Each connection part 32 of the sensor body 3 includes two catching pieces 321 and 322. Each of the catching pieces 321 and 322 is formed into a flat shape and has a thickness direction equal to the forward and rearward direction. The catching pieces 321 and 322 face to each other and are spaced by an interval. With regard to the sensor body 3, at least the connection part 32 is formed of elastic material (e.g., synthetic resin). The connection part 32 can be elastically deformed to increase a distance between lower ends of the respective catching pieces 321 and 322. Additionally, with regard to each connection part 32, a latching hole 323 is formed in the catching piece 321 which is one of the catching pieces close to a side of a clockwise direction viewed from the transmitting and receiving surface 311, and the latching hole 323 is designed to receive the latching protrusion 221 of the mounting base 2 in a latching manner. Further, to facilitate the aforementioned elastic deformation, slits 324 are appropriately formed in a vicinity of the latching hole 323 for each catching piece 321 of the connection part 32.

As mentioned above, the connection piece 32 includes the catching piece (first catching piece) 321 and the catching piece (second catching piece) 322. The second catching piece 322 is formed into a U-shape, and has an accommodating space 3221 designed to accommodate the reception piece 22 therein. The reception piece 22 is inserted into the accommodating space 3221 from a front side (direction indicated by arrow B) of the second catching piece 322. Further, the second catching piece 322 is provided with an opening 3222 exposing the pedestal 223 of the reception piece 22 to the outside. The first catching piece 321 is formed into a rectangular plate shape, and includes the latching hole 323 for receiving the latching protrusion 221. The first catching piece 321 is positioned inside the opening 3222 such that the reception piece 22 inside the accommodating space 3221 is held between the first catching piece 321 and the second catching piece 322. Note that, the first catching piece 321 is in contact with the front surface of the pedestal 223 of the reception piece 22. Thus, there is a predetermined gap between the first catching piece 321 and the basement 222 (see FIG. 3). This gap is used as a space for allowing displacement of the first catching piece 321. The first catching piece 321 is linked to the second catching piece 322 via two spring parts 325 to allow displacement of the first catching piece 321 relative to the second catching piece 322. Each spring part 325 is defined as a part between the two slits 324.

To fix the present embodiment to the bumper 1, at first the two mounting bases 2 are bonded to the inner surface of the bumper 1 to opposite to each other with regard to the exposing hole 11. In this regard, the connection part 22 is positioned close to the exposing hole 11, and the two mounting bases 2 are positioned such that protrusion directions of the latching protrusions 221 thereof are opposite to each other.

Figure 3:
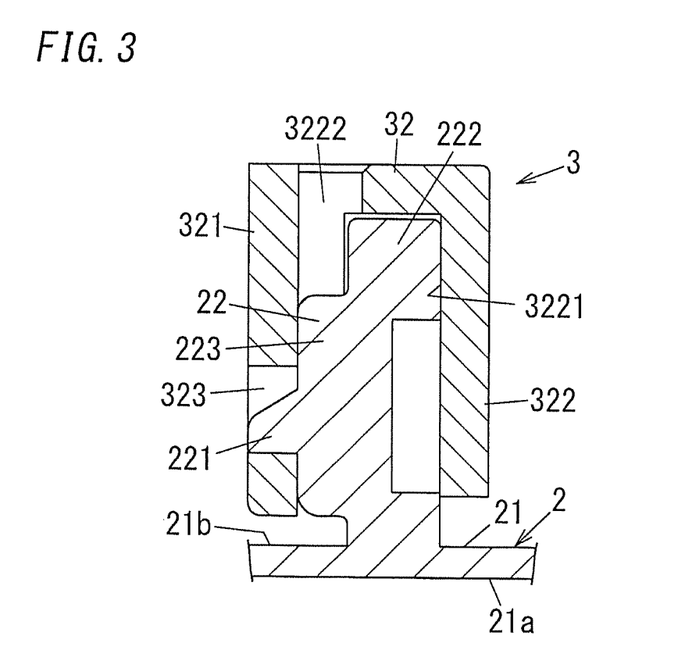
FIG. 3 is a sectional view illustrating the connector of the ultrasonic-transducer mounting structure of the above embodiment.

Subsequently, the connection parts 22 of the mounting bases 2 are inserted into spaces between the catching pieces 321 and 322 of the connection parts 32 of the sensor body 3 respectively and then the sensor body 3 is pressed downward (toward the bumper 1). In this regard, the catching piece 321 slides on the inclined surface of the latching protrusion 221, and thus the connection part 32 is elastically deformed to increase the distance between the lower ends of the respective catching pieces 321 and 322. When the latching holes 323 of the connection parts 32 reach the corresponding latching protrusions 221, each connection part 32 is restored to its normal shape and, as shown in FIG. 3, the latching protrusions 221 are fitted into the corresponding latching holes 323. Note that, a movement of the sensor body 3 in the upward direction (i.e., a direction away from the bumper 1) is prohibited by contact between an inner surface of the latching hole 323 and the latching protrusion 221 of the mounting base 2. Further, rotation of the sensor body 3 around the axis of the body part 31 is prohibited by contact between the connection part 22 of the mounting base 2 and each of the catching pieces 321 and 322. In other words, the connection part 22 of the mounting base 22 serves as a rotation prohibiting part. In the aforementioned state, an upper end of the latching piece 321 provided with the latching hole 323 is positioned upwardly relative to an upper end of the connection part 22 of the mounting base 2.

Note that, actually, a process of bonding each mounting base 2 to the bumper 1 may be performed after a process of coupling each mounting base 2 to the sensor body 3.

Figure 4:
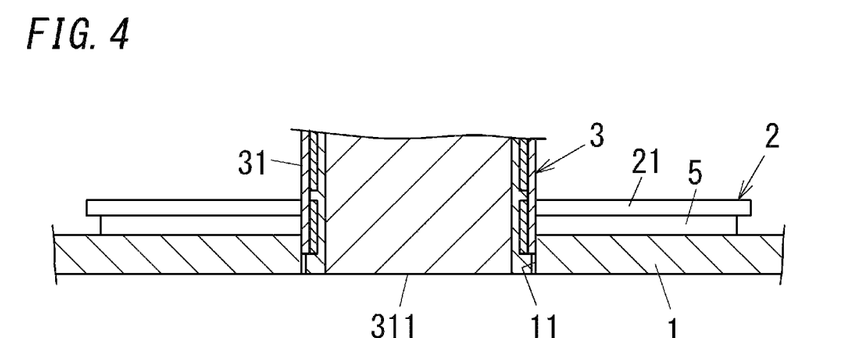
FIG. 4 is a partial sectional view illustrating the ultrasonic-transducer mounting structure of the above embodiment.
Figure 5:
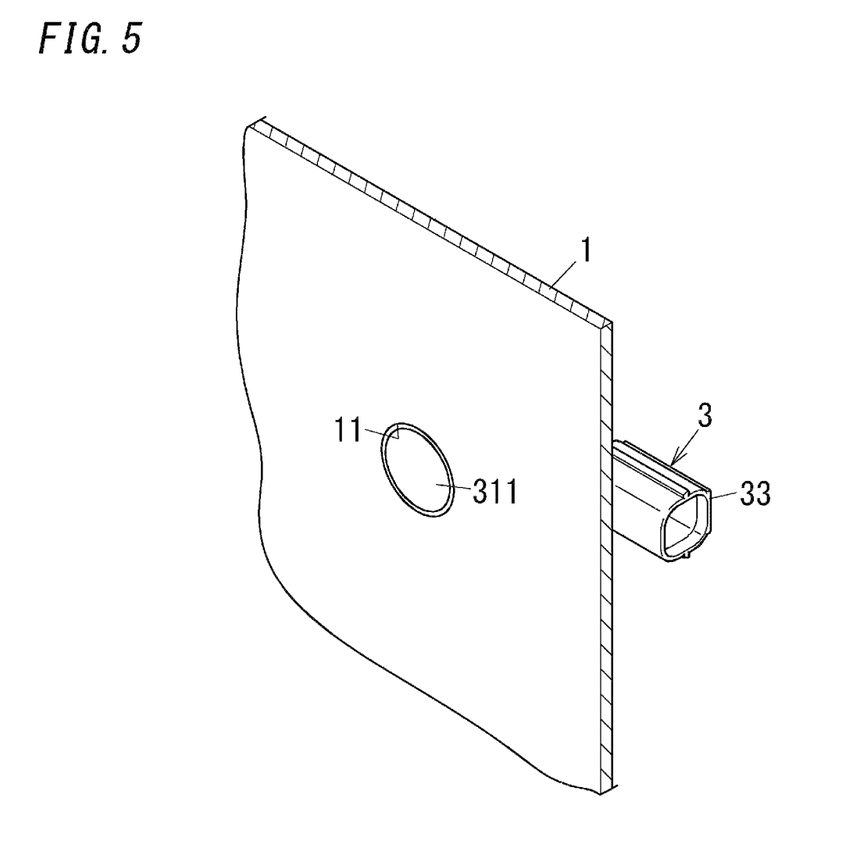
FIG. 5 is a perspective view illustrating the ultrasonic-transducer mounting structure of the above embodiment viewed from the front side.

As shown in FIG. 4, in a situation where the sensor body 3 is attached to the mounting bases 2 in the aforementioned manner, a protrusion dimension of the sensor body 3 in a direction (downward direction in FIG. 4) away from the connection parts 22 which is equal to a protrusion dimension of the sensor body 3 relative to the fixed parts 21 of the mounting bases 2 is same as a thickness of the bumper 1 which is used as a bumper to which the present embodiment is attached. Hence, when the attachment of the present embodiment to the bumper 1 is completed, the transmitting and receiving surface 311 is approximately flush with an outer surface (lower surface in FIG. 4) of the bumper 1. When the exposing hole of the bumper 1 has an inner diameter which is approximately equal to an outer diameter of the body part 31 of the sensor body 3, only the transmitting and receiving surface 311 is exposed via the exposing hole 11 when viewed from the outer surface side of the bumper 1, as shown in FIG. 5.

To detach the sensor body 3 from each of the mounting bases 2, the catching piece 321 provided with the latching hole 323 is pressed at its portion located upward relative to the connection part 22 of the mounting base 2 in a direction (right direction in FIG. 3) in which the catching piece 321 gets close to the other catching piece 322. Consequently, the connection part 32 is elastically deformed such that the aforementioned catching piece 321 is rotated around a contact point with the connection part 22 of the mounting base 22 as a fulcrum point. This releases engagement between the latching hole 323 and the latching protrusion 221.

Therefore, the movement of the sensor body 3 in the upper direction (i.e., a direction away from the fixed part 21 of the mounting base 2) is allowed.

As mentioned above, the present embodiment relates to the ultrasonic sensor mounted on the bumper 1, and includes the plural mounting bases 2 and the sensor body 3. Each of the mounting bases 2 includes the fixed part 21 fixed on the inner surface of the bumper 1. The sensor body 3 includes at least one of the transmitter designed to transmit an ultrasonic wave and the receiver designed to receive an ultrasonic wave. Each of the mounting bases 2 includes the connection part 22. The sensor body 3 includes the plural connection parts 32 respectively connected to the connection parts 22 of the mounting bases 2 in a detachable manner.

The ultrasonic sensor includes at least one mounting base 2 which includes the fixed part 21 provided with at least one of the groove 211 and the slits 212 and 213.

Further, the ultrasonic sensor includes at least one mounting base 2 which includes the rotation prohibiting part designed to prohibit the rotation of the sensor body 3 relative to each of the mounting bases 2 by being in contact with the sensor body 3.

In other words, the ultrasonic-transducer mounting structure of the present embodiment includes the housing (sensor body) 3 and the holder 6. The housing (sensor body) 3 includes the body part 31 and the plural connection pieces (connection parts) 32. The body part 31 is formed into a hollow cylindrical shape and is provided at its front surface with the transmission surface (transmitting and receiving surface) 311 allowing an ultrasonic wave to pass therethrough and is designed to accommodate an ultrasonic transducer therein. The plural connection pieces (connection parts) 32 are provided to the side surface of the body part 31. The holder 6 is fixed to the rear surface of the bumper 1 and is designed to hold the housing 3 such that the transmission surface 311 of the housing 3 is exposed via the opening (exposing hole) 11 of the bumper 1. The holder 6 includes the plural reception pieces (connection parts) 32 to which the plural connection pieces (connection parts) 22 are detachably coupled respectively. The plural reception pieces 22 are fixed to the rear surface of the bumper 1 to surround the opening 11.

Further, in the ultrasonic-transducer mounting structure of the present embodiment, the holder 6 includes the plural fixed plates (fixed parts) 21 respectively corresponding to the plural reception pieces 22. Each fixed plate 21 has the first surface 21a in the thickness direction and is fixed to the rear surface of the bumper 1 at its first surface 21a. Each fixed plate 21 has the second surface 21b in the thickness direction to which the corresponding reception piece 22 is provided. Each fixed plate 21 is flexible to allow the fixed plate 21 to be deformed along the rear surface of the bumper 1.

Furthermore, in the ultrasonic-transducer mounting structure of the present embodiment, the fixed plate 21 is provided with at least one of the slit 212 (213) and the groove 211 to allow the fixed plate 21 to be bent along the rear surface of the bumper 1. Note that, in the ultrasonic-transducer mounting structure of the present embodiment, the fixed plate 21 may be provided with at least one of the slit 212 (213) and the groove 211 such that the fixed plate 21 is allowed to be bent along the rear surface of the bumper 1.

Moreover, in the ultrasonic-transducer mounting structure of the present embodiment, the connection piece (connection part) 32 and the reception piece (connection part) 22 corresponding to the connection piece 32 are designed to be in contact with each other in the rotation direction around the central axis of the opening 11.

According to the aforementioned configuration, in contrast to an instance where an ultrasonic sensor is constituted by two blocks and the two blocks are coupled to each other such that a bumper is interposed between the two blocks located inside and outside of the bumper, part of the ultrasonic sensor is not protruded outwardly from the bumper. Consequently, in contrast to an instance where part of the sensor body 3 is protruded outwardly from the bumper 1, the present embodiment can have the improved appearance. In addition, since the sensor body 3 is provided with the plural connection parts 32, detachment of the sensor body 3 from the bumper 1 can be impeded in comparison with an instance where the sensor body 3 is provided with the single connection part 32.

Further, the sensor body 3 may be in contact with the upper surface (i.e., the inner surface) of the bumper 1, and an upward and downward width between a lower surface of the latching protrusion 221 and a lower surface of the fixed part 21 of each mounting base 2 may be slightly less than an upward and downward width between a surface of the sensor body 3 in contact with the upper surface of the bumper 1 and a lower end of the latching hole 323. Accordingly, while the sensor body 3 is mounted on the bumper 1 by use of the mounting bases 2, the sensor body 3 and each mounting base 2 are elastically deformed, and such elastic force causes pressing the sensor body 3 against the upper surface of the bumper 1.

Accordingly, in this ultrasonic sensor, while the sensor body 3 is coupled to the mounting bases 2 respectively fixed to the bumper 1, at least one of each mounting base 2 and the sensor body 3 is elastically deformed to produce elastic force which causes pressing the sensor body 3 against the inner surface of the bumper 1. In other words, in the ultrasonic-transducer mounting structure of the present embodiment, the holder 6 is designed to hold the housing 3 such that the body part 31 is in contact with the rear surface of the bumper 1 at a predetermined pressure.

With employing the aforementioned configuration, in contrast to a configuration where the upward and downward width between the lower surface of the latching protrusion 221 and the lower surface of the fixed part 21 of each mounting base 2 is greater than the upward and downward width between the surface of the sensor body 3 in contact with the upper surface of the bumper 1 and the lower end of the latching hole 323, it is possible to prevent backlash of the sensor body 3 while the sensor body 3 is attached to the bumper 1.

Note that, detailed configurations may be modified appropriately. For example, the numbers of connection parts 22 and 23 and the number of mounting bases 2 are not limited to two, but may be three or more. When the holder 6 includes the "n" mounting bases 2 (n is an integer equal to or more than 3), the "n" mounting bases 2 is preferably arranged in an n-fold rotational symmetry manner. Further, the single mounting base 2 may be provided with the two or more connection parts 22. For example, such a mounting base 2 has a ring structure or a U-shaped structure which is similar to a structure where at least one of the front ends and the rear ends of the fixed parts 21 of the two mounting bases 2 are connected to each other. Note that, in contrast to an instance where the plural connection parts 22 respectively connected to the plural connection parts 32 are provided to the single mounting base 2, using the plural mounting bases 2 respectively corresponding to the plural connection parts 32 of the sensor body 3 in a similar manner as the present embodiment can facilitate application to the bumper 1 with the curved surface.

With regard to constructions of the connection parts 22 and 32, for example, in contrast to the present embodiment, the connection part 32 of the sensor body 3 may be held between portions of the connection part 22 of the mounting base 2.

The invention claimed is:

1. An ultrasonic-transducer mounting structure comprising:
   a housing including: a body part which is formed into a hollow cylindrical shape and is provided at its front surface with a transmission surface allowing an ultrasonic wave to pass therethrough and is designed to accommodate an ultrasonic transducer therein; and plural connection pieces provided to a side surface of the body part; and
   a holder fixed to a rear surface of a bumper and designed to hold the housing such that the transmission surface of the housing is exposed via an opening of the bumper, wherein:
   the holder includes plural reception pieces to which the plural connection pieces are detachably coupled respectively;
   the plural reception pieces are fixed to the rear surface of the bumper to surround the opening,
   the holder includes plural fixed plates respectively corresponding to the plural reception pieces,
   each of the fixed plates has a first surface and is fixed to the rear surface of the bumper at the first surface, and each of the fixed plates has a second surface to which the corresponding reception piece is provided.

2. The ultrasonic-transducer mounting structure as set forth in claim 1, wherein:

each fixed plate is flexible to allow the fixed plate to be deformed along the rear surface of the bumper.

3. The ultrasonic-transducer mounting structure as set forth in claim 2, wherein the fixed plate is provided with at least one of a slit and a groove to allow the fixed plate to be bent along the rear surface of the bumper.

4. The ultrasonic-transducer mounting structure as set forth in claim 1, wherein the connection piece and the reception piece corresponding to this connection piece are designed to be in contact with each other in a rotation direction around a central axis of the opening.

5. The ultrasonic-transducer mounting structure as set forth in claim 1, wherein the holder is designed to hold the housing such that the body part is in contact with the rear surface of the bumper at a predetermined pressure.

6. The ultrasonic-transducer mounting structure as set forth in claim 1, wherein:

each of the plural reception pieces includes a basement, each of the plural connection pieces includes a first catching piece and a second catching piece, the first catching piece and the second catching piece facing each other and forming a space therebetween, and the basement of each of the plural reception pieces is inserted into the spaces of each of the plural connection pieces, thereby coupling the plural reception pieces to the plural connection pieces on a one to one basis.

7. The ultrasonic-transducer mounting structure as set forth in claim 1, wherein:

each of the plural connection pieces includes a basement;

each of the plural reception pieces includes a first catching piece and a second catching piece, the first catching piece and the second catching piece facing each other and forming a space therebetween; and the basement of each of the plural connection pieces is inserted into the space of each of the plural reception pieces respectively, thereby coupling the plural connection pieces to the plural reception pieces on a one to one basis.

* * * * *